United States Patent [19]

Megelas

[11] 3,995,815
[45] Dec. 7, 1976

[54] PRODUCTION OF FLAKED METALLIC POWDERS

[75] Inventor: Michael Megelas, Clinton, N.J.

[73] Assignee: International Bronze Powders Ltd., Montreal, Canada

[22] Filed: Oct. 25, 1974

[21] Appl. No.: 518,059

[52] U.S. Cl. .................................. 241/15; 241/30; 241/46.15

[51] Int. Cl.² ........................................ B02C 23/36

[58] Field of Search ............ 241/15, 46.08, 46.11, 241/46.15, 46.17, 30, 46 R, 46.02

[56] References Cited

UNITED STATES PATENTS

| | | | |
|---|---|---|---|
| 2,416,746 | 3/1947 | Gavin | 241/30 |
| 2,628,081 | 2/1953 | Laird | 241/46.17 X |
| 2,764,359 | 9/1956 | Szegvari | 241/15 |
| 3,199,792 | 8/1965 | Norris, Jr. | 241/30 |
| 3,329,348 | 7/1967 | Pootmans | 241/30 |
| 3,486,702 | 12/1969 | Kmeco | 241/46.17 |
| 3,709,439 | 1/1973 | Tundermann et al. | 241/15 |
| 3,720,379 | 3/1973 | Szegvari | 241/46.15 |
| 3,776,473 | 12/1973 | Casey et al. | 241/15 |

Primary Examiner—Granville Y. Custer, Jr.
Attorney, Agent, or Firm—Alan Swabey & Co.

[57] ABSTRACT

Flaked metal powders are made by subjecting finely divided metal and a lubricant in a heterogeneous liquid system in a ball mill in which there is a mass of attritive elements through which an agitator is moved to displace the elements. The weight ratio of attritive elements to finely divided metal is within the range from 37 to 1 to 10 to 1. The weight ratio of inert liquid to finely divided metal is preferably within the range from 0.5 to 1 to 1 to 4. The weight ratio of finely divided metal to lubricant is preferably within the range from 30 to 1 to 1 to 1. The attritive elements preferably have a diameter within the range from 1/32 inch to 1 inch (0.8 to 25.4 mm). Preferred temperatures, times and other conditions are disclosed. Apparatus for carrying out the method includes, in addition to the attritive elements and the agitator, additional agitating means producing agitation in a relative direction counter to that of the agitator. The additional means may be rods extending among the attritive elements. The additional agitating means may be in the form of an attachment for a ball mill.

19 Claims, 10 Drawing Figures

PRODUCTION OF FLAKED METALLIC POWDERS

BACKGROUND OF THE INVENTION

1. Field of the Invention

This invention relates to the production of flaked metal powders.

It is understood that the expression "flaked metal powders" means metal or alloy platelets whose ratio of thickness to length is smaller than 0.1. On the other hand, as used in the present specification and in the appendant claims the term "metal powder" should be understood to mean "flaked metal powder", unless otherwise stated.

2. Description of the Prior Art

The conventional way of producing such powders is by the use of a tube ball mill in which starting metal particles are tumbled together with grinding elements to produce a high ratio of impact to attritive action. This method has certain limitations and can be generally said to be relatively inefficient and time consuming.

Tundermann's U.S. Pat. No. 3,709,439, issued Jan. 9, 1973 discloses a process for producing metal flakes from metal powder made of a stain-resisting metal or alloy thereof in which a charge of the powder is milled in a mobile liquid medium in the presence of grinding bodies confined in a milling space. The volume ratio of the liquid medium to the metal powder is at least 10:1 to 50:1. Subsequently all the intersititial space between the grinding bodies when at rest in the milling space is filled with the liquid medium. The liquid medium contains a small amount of lubricant effective to coat the flaked product. The starting metal powder has a particle size preferably passing abut 100 mesh and preferably the milling is continued until the thickness of at least a substantial portion of the metal powder is reduced below about 1 micron. The volume ratio of the liquid medium to the metal powder is given as at least 20:1.

SUMMARY OF THE INVENTION

The applicant has found that it is possible to obtain flaked metal powders using a high ratio of attritive action to impact which is not usually employed to make metal powders, and is disclosed in the specification of U.S. Pat. No. 2,764,359, the disclosure of which is hereby incorporated by reference. It has been found that improved efficiency results from this mode of operation. The method of this patent involves treating a heterogeneous liquid system in an enclosure containing a mass of substantially spherical attritive elements. An agitator is continuously moved through the elements to displace those which are in its path. The speed of movement of the agitator is sufficient to impart movement to most or even all of the elements. The movement is at least of a partially random nature in which each of the elements repeatedly and continuously move from contact with one element into contact with another and with the agitator, and the mass of elements remain suspended in the system.

An apparatus for carrying out this method includes an upright substantially cylindrical vessel. An agitator shaft is rotatable axially of the vessel. Arms extend substantially horizontally from the shaft, at least some of them being paired with and separated from other arms longitudinally of the shaft. The attritive elements comprise balls which may be of the same size or of different sizes. They fill the vessel to such a depth that at least the bottom arm of the agitator is always covered with the elements.

The heterogeneous liquid system is made up of an insert liquid, a lubricant and a finely divided metal in which the ratio of attrictive elements to finely divided metal is between 37 to 1 and 10 to 1 by weight.

Suitably, the ratio of inert liquid to finely divided metal is between 0.5 to 1 and 1 to 4 by weight and the ratio to finely divided metal to lubricant is between 30 to 1 and 1 to 1 by weight. The attritive elements suitably have diameters between 1/32 inch and 1 inch (0.8 mm and 25.4 mm).

The method of the invention departs from the previous method by employing a lower weight ratio between the metal and the elements, and preferably by the liquid suspending medium being at a considerably lower weight ratio to the elements than before.

In a preferred method of the invention the upper portions of the mass of grinding elements and material being ground are subjected to an additional agitating effect in a direction counter to that in which the agitator moves by providing suitable baffles.

According to a second aspect of the invention there is provided apparatus for making flaked metal powders including an enclosure containing a mass of attritive elements and an agitator adapted to move through the mass of elements and displace those in its path and means projecting into the enclosure in intercepting relationship to the mass of attritive elements whereby in use an additional agitating of the elements is produced in a relative direction counter to that in which the agitator moves. The means projecting into the enclosure may be rods and/or plates.

The invention also provides an attachement for a mill comprising an enclosure and an agitator, said attachment comprising a frame with rods or prongs depending therefrom for insertion in the enclosure to co-operate with the agitator grinding media in the enclosure.

BRIEF DESCRIPTION OF DRAWINGS

In order that this invention may be more clearly understood, the following description is given, merely by way of example, with reference to the accompanying drawings in which.

DESCRIPTION OF THE PREFERRED EMBODIMENTS

Figure 1:
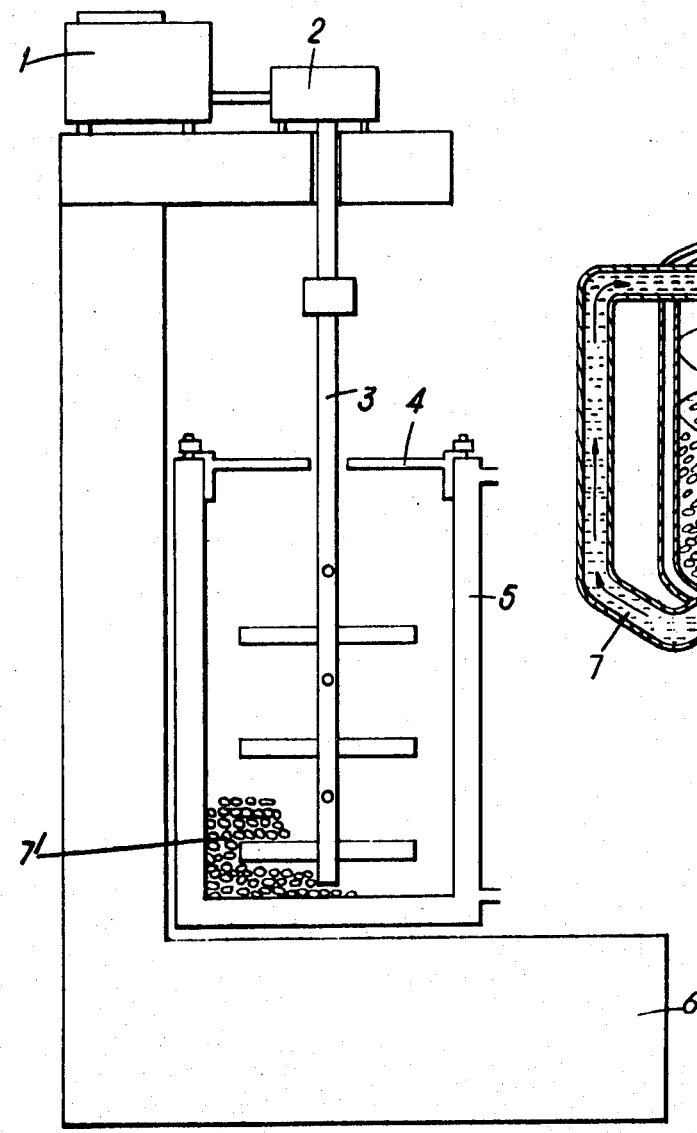
FIG. 1 is a side elevation, partly in section showing an apparatus capable of carrying out the method of the invention.

Referring to the drawings, a preferred apparatus is shown in FIG. 1 to include a drive motor 1 connected to a gear speed reducer 2, in turn connected to an agitator shaft 3, extending through a cover 4 into a cylindrical jacketed grinding enclosure 5. The apparatus is held on a base and stand 6. The vessel 5 is filled with a mass of metallic balls 7' which serve as grinding media.

Figure 2:
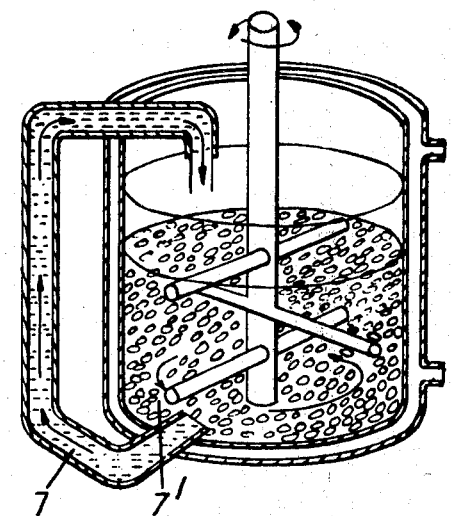
FIG. 2 is a perspective sectional view showing in more detail the enclosure and agitator.

FIG. 2 shows a pipe 7 which extends from the bottom of the vessel 5 back to the top of the vessel for recycling partially ground material.

Figure 3:
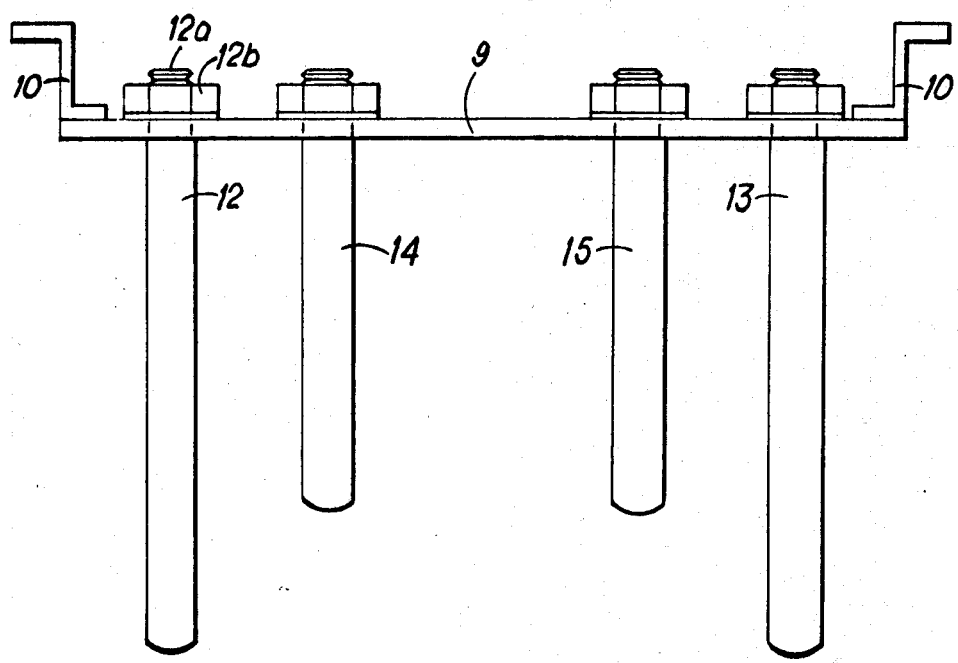
FIG. 3 is a side elevation of an attachment for the enclosure.
Figure 4:
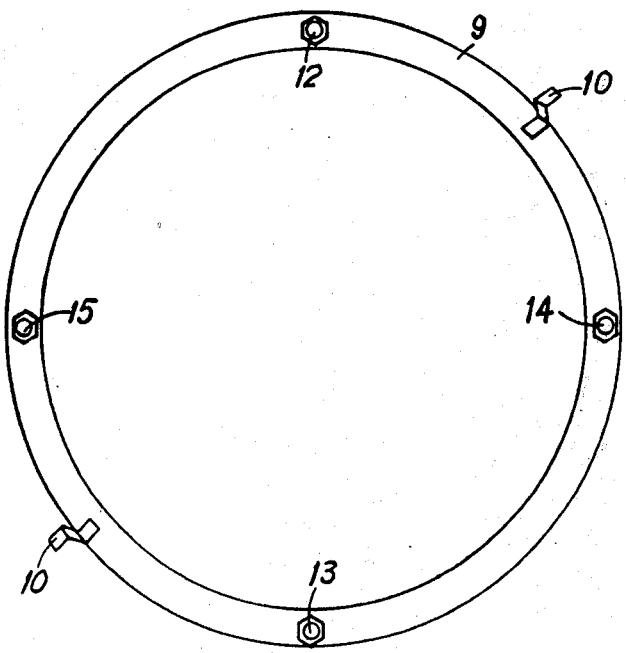
FIG. 4 is a plan view of the attachement of FIG. 3.

For producing improved efficiency in the process the attachment shown in FIGS. 3 and 4 may be employed. This attachment including a supporting ring 9 on which are fixedly mounted supporting brackets 10. Extending downwardly from the ring 9 are four rods 12, 13, 14 and 15 which can be of the same or different lengths. The rod 12, by way of example, is held to the ring by a shank 12a of reduced diameter which extends to an opening in the ring 9 provided with a threaded end carrying a nut 12b.

The attachment is applied to the top of the vessel 5 with the brackets 10 resting on the top lip of the vessel and supporting it, and the rods 12, 13, 14 and 15 projecting down into the vessel.

In normal operation, with or without the attachment, the shaft 3 is rotated by the motor 1, passing through the mass 7' of grinding balls and agitating them in a manner, the general nature of which will be well understood by one skilled in the art and from the description in U.S. Pat. No. 2,764,359.

The shape of the rods or prongs 12, 13, 14 and 15 is not critical. Preferred shapes are triangular or circular cross-sections. The rods should, at least, touch the surface of the grinding media, and, can penetrate below the surface either to equal depths or variable depths from fractions of an inch to close to the bottom of the container.

Alternatively, as shown in FIGS. 7 to 10, at least one baffle 50, 50a, and preferably a plurality, may be used in place of or additional to the rods or prongs 12, 13, etc. The baffle or baffles may either slide into channels in the side of the enclosure or be attached by welding or any other suitable means along the height of the enclosure or to part of the height on its periphery.

Figure 7:
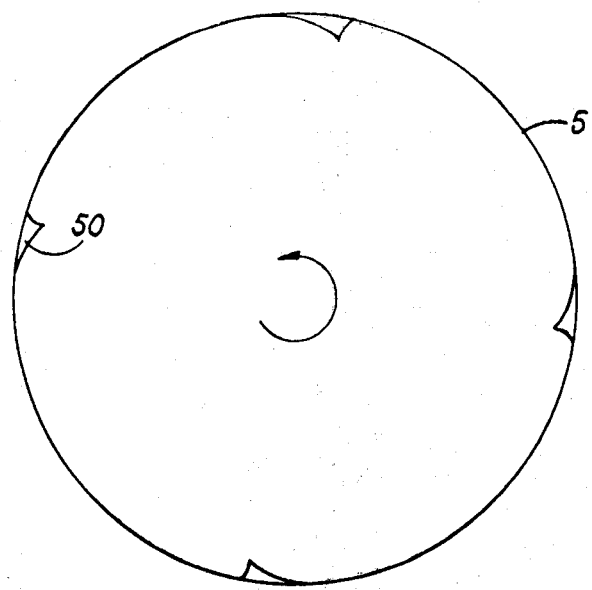
FIG. 7 is a diagrammatic plan view showing another form of enclosure, illustrating baffles employed to modify the movement of the grinding media.
Figure 8:
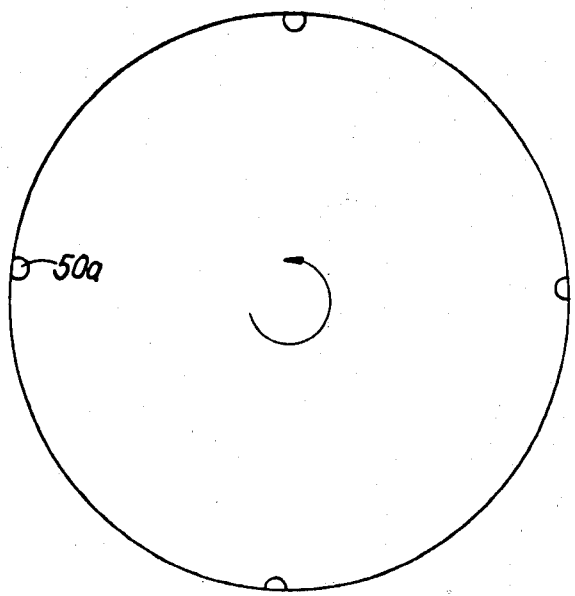
FIG. 8 is a view similar to FIG. 7 showing another form of baffle.
Figure 9:
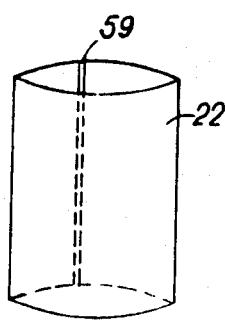
FIG. 9 is a diagrammatic perspective view of an enclosure of FIGS. 7 or 8 to illustrate the orientation of a baffle.
Figure 10:
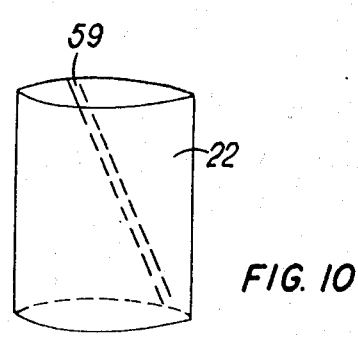
FIG. 10 is a view similar to that of FIG. 9 showing another orientation of a baffle.

One form of baffle 50 is shown in FIG. 7, to have two curved sides, that side towards which the agitator rotates (as indicated by the arrow) being at a greater inclination to the side wall of the enclosure. A second form of baffle 50a which is substantially circular in cross section is shown in FIG. 8. FIG. 9 shows a baffle 59 parallel to the axis of the container 22 and FIG. 10 a baffle 59 not parallel to the axis. The baffles 59 can if desired be of helical form in the container.

The baffles act as brakes to the movement of the grinding medium. This causes some turbulence, whereas the prongs or rods 12, 13, 14, 15 act as deflectors which may be preferable in practice. When prongs or rods are used the grinding media on the upper surface of the enclosure are deflected towards the center of the enclosure and lower media and metal of the batch tend to move upwards to replace the deflected portions. Overall, a vertical agitating action is created which markedly improves the grinding and flaking efficiency of the process.

The attachment may equally be used on any flanking, grinding, mixing or agitating equipment in which the agitating means do not touch the inner peripheral wall of the container and where the clearance is sufficient to enable the use of such an attachment. The attachment may be used with rotating elements which vary with regard to size or shape.

Working with this apparatus within the conditions disclosed in said patent specification results in a finely divided powder with no flaking and no leafing. To produce flaking and leafing, it is necessary to observe certain conditions which have been discovered by the applicant.

In prior art as applied to tube ball mills there are employed spherical steel balls of diameter 3/16 of an inch (4.76 mm) and a ratio of balls to metal by weight of at least 40 to 1. Normally the ratio of suspending fluid, for example, a petroleum solvent commonly used as a paint and varnish thinner and sold under the trademark "VARSOL" by Humble Oil and Refining Company, is about 1 to 1 and the metal to lubricant ratio is about 10 to 1 by weight. The temperature range is from about 105° F to about 110° F (40.6° C to about 43.3° C) and the milling time is usually about 2 hours. Employing these conditions using the apparatus described in this application, no flaking and no leafing results.

According to the applicant's preferred procedure, steel balls are employed as the attritive elements, with a range of diameter from about 1/32 inch to 1 inch (0.8 mm to 25.4 mm), preferably about 3/16 inch (4.76 mm). The balls can be of the same size or be of mixed sizes. The weight ratio of attritive elements to the metal should be between 37 to 1 and 10 to 1. Suitably the ratio of inert liquid to metal is between 0.5 to 1 and 1 to 4. The ratio of metal to lubricant may be between 30 to 1 to 1 to 1. The temperature may range from about 60° F to about 150° F (15.6° C to about 65.6° C) with about 130° F (54.4° C) preferred, with a milling time within the range from about 1 to about 16 hours. Carrying out the attrition by operating within these limits produces a metal powder having good flaking, good leafing, and good coverage.

Figure 5:
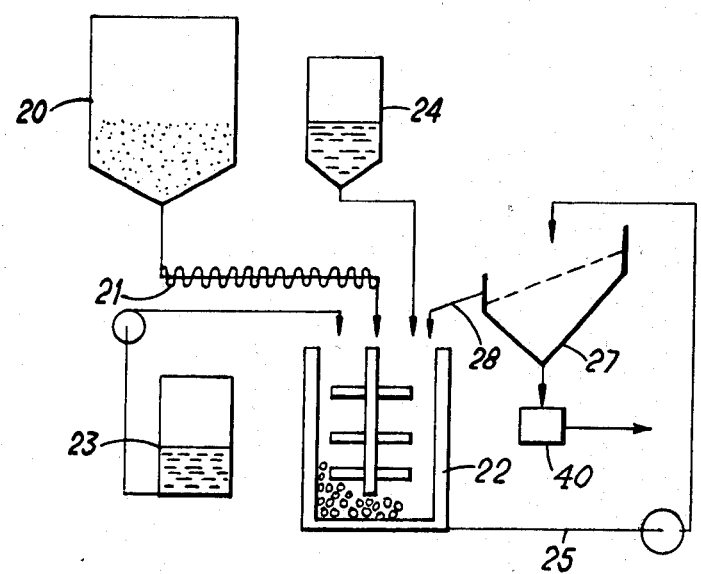
FIG. 5 is a diagrammatic illustration of a preferred arrangement of apparatus for carrying out the process of the invention.
Figure 6:
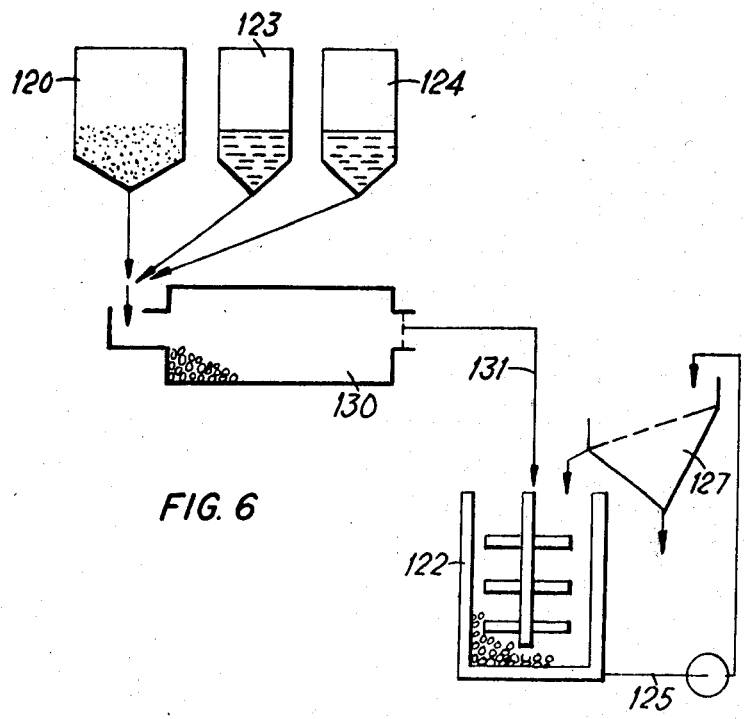
FIG. 6 is a diagrammatic illustration of an alternative arrangement of apparatus for carrying out the process of the invention.

FIG. 5 is a schematic diagram or flow sheet for the production of flaked metal powders according to one embodiment of the invention; and FIG. 6 is a similar diagram wherein a preliminary milling step is also represented.

Referring to FIG. 5, in a container 20 is the feed material which is finely divided metal which may be ¼ inch (6.35 mm) triple cut annealed or unannealed aluminum foil, atomized aluminum or any other suitable malleable and ductile metal or alloy. For example the treatment can be applied to atomized copper, atomized zinc, atomized stainless steel, carbonyl nickel, cupro nickel, brass, ferro-chrome powder, etc. This material is fed from the container 20 through a screw conveyor 21 into the enclosure 22, containing an agitator. An inert liquid grinding medium such as Varsol (Trademark) is fed from a tank 23 into the enclosure 22 and a lubricant is also fed from tank 24 to the enclosure. Ground material is removed from the bottom of the enclosure 22 through a pipe 25 into a sieve 27 through which the end product is drawn and the oversize material which does not pass through the sieve is passed through a pipe 28 back into the enclosure 22 for further grinding.

In FIG. 6 to which the same reference numbers have been applied, with the exception that they have been raised by 100, the material to be flaked, in container 120, the inert liquid medium from 123 and the lubricant from 124 pass to a continuous tube or ball mill 130 where coarse milling takes place. The coarse flaked material is fed through a pipe 131 to the enclosure 122. The pipe 125, and sieve 127 are as in FIG. 5.

After delivery from the apparatus shown, the flaked metal may be subjected to further flaking e.g. in a ball mill 40 to reduce flake size, or be subjected to some other treatment.

The feed materials which may be used are finely divided metals produced by cutting up metal foil, by atomizing molten metal, or by granulating cut metal foil. Any metal that can be powdered or flaked is a potential feed material. Preferred examples are aluminum, copper, brass, zinc, tin, steel and alloys of these metals.

Specific combinations of preferred criteria according to embodiments of the invention, as compared with the prior art, are shown, by way of illustration, in the following examples.

EXAMPLE I

Standard Conditions for Tube Milling were used with 3/16 inches (4.76 mm) steel balls in a ratio to the metal of 40:1 by weight. The inert suspending fluid (in the case Varsol) ratio to metal was 1:1, and the metal to lubricant (stearic acid) ratio was 10:1. The temperature range was 105°–110° F (40.6°–43.3° C), and the milling time 2 hours. The speed of the agitators was the maximum possible (in this case 100 rpm). No attachment of prongs, rods or baffles was used. The resulting material displayed no flaking or leafing.

EXAMPLE II

Conditions according to the invention were used with 3/16 inches (4.76 mm) steel balls in a ratio to the metal 37:1; the inert liquid to metal ratio was 2:3; the metal to lubricant ratio was 3:2; all ratios being by weight. The temperature was 120° F (48.9° C), and the time taken 4 hours. The agitator speed was 100 rpm, but no prongs or baffles were used. The result was good flaking and very good leafing of the product. The water coverage of the fraction passing through a 325 mesh (Tyler) sieve was 13,000 cm$^2$/gm, and of the fraction passing through 400 mesh (Tyler) sieve 14,000 cm$^2$/gm. The water coverage was measured in this and Example III according to the method described in "Aluminum Paint and Powder" bu Edwards & Ray, Reinhold Publishing Company (1955) at pages 39, 40 and 41.

EXAMPLE III

Conditions according to the invention were used together with an attachment as shown in FIGS. 3 and 4. The grinding medium was 3/16 inch (4.76 mm) steel balls in a ratio to the metal 37:1. The inert liquid to metal ratio was 2:3; the metal to lubricant ratio was 3:2. The temperature was between 120° and 130° F (49° and 54.4° C), and the time taken 4 hours. The speed of the agitators was 100 rpm, and the attachment of FIGS. 3 and 4 was used. The result was a product with excellent flaking and leafing. Water coverage of the fraction passing through a 325 mesh (Tyler) sieve was 23,000 cm$^2$/gm, of the fraction passing through a 400 mesh (Tyler) sieve was 30,000 cm$^2$/gm. The percentage improvement in water coverage over the products of Examples I was 77% for the fraction through 350 mesh and 114% for the fraction through 400 mesh.

EXAMPLE IV

Standard conditions for tube milling were used with ⅛ inch (3.175 mm) steel balls in a ratio to the metal of 40:1 by weight. The inert suspending fluid (in this case mineral spirits) ratio to metal was 1:1, and the metal to lubricant (stearic acid) ratio was 10:1. Milling time was four hours. The speed of te agitators was 230 rpm. No attachment of prongs, rods or baffles was used. The yield was less than 50% of minus 325 mesh material. The water coverage measured as in Example II was less than 4000 cm$^2$/gm. Virtually no flaking (only grinding) occurs.

EXAMPLE V

A test was run using ⅛ inch (3,175 mm) steel balls in a ratio to the metal of 37:1 by weight. The inert suspending fluid (in this case mineral spirits) ratio to metal was 2.3:1, and the metal to lubricant (stearic acid) ratio was 27:1. Milling time was four hours. The speed of the agitators was 230 rpm. Additional baffles were used as attachment. The yield was less than 50% of minus 325 mesh material. The water coverage measured as in Example II was 14,700 cm$^2$/gm which is less coverage than is normal for this fineness of pigment.

EXAMPLE VI

A test was carried out under the same conditions as in the preceding Example except that no additional baffles were used. The yield was the same, but the water coverage was only 11,700 cm$^2$gm, which of course is less coverage than is normal for this fineness of pigment.

EXAMPLE VII

A test was carried out under the same conditions as in Example V except that the inert suspending fluid ratio to metal was 0.6:1. The yield was 99% of minus 325 mesh material. The water coverage was 22,000 cm$^2$/gm which is better coverage than normal for this fineness of pigment.

EXAMPLE VIII

A test was carried out under the same conditions as in the preceding Example except that the metal flake was atomized copper. The yield was 99.8% of minus mesh material. The water coverage was 7200 and in appearance the resulting product was a bright attractive pigment.

EXAMPLE IX

A test was carried out under the same conditions as in the preceding Example except that no additional baffles were used. The yield was the same, however the water coverage was only 4300. The resulting product was still a bright attractive pigment.

EXAMPLE X

A test was carried out under the same conditions as in the preceding Example except that the metal to lubricant ratio was 4.5:1 and the metal which was treated was atomized zinc. The yield was the same and the water coverage was 3000. The product was a bright attractive pigment.

EXAMPLE XI

A test was carried out under the same conditions as in the preceding Example, except that additional baffles were used. The yield was the same and the water coverage was 4400. The resulting product was a bright attractive pigment.

EXAMPLE XII

Standard conditions for tube mills were used with ⅛ inch (3.175 mm) steel balls in a ratio to the metal of 13.3:1. No lubricant was used. Milling time was four hours. The speed of the agitators was 110 rpm. Additional baffles were used as attachment. The water coverage measured as in Example II was 4,600 cm²/gm, which is less coverage than is normal for this fineness of pigment.

By raising the balls/metal ratio there will be an increase of production ratio until the ratio reaches 37:1. If this ratio is exceeded a grinding rather than flaking action results.

Other steel alloys have been used and the same results have been obtained.

EXAMPLE XIII

A test was carried out using carbonyl nickel under the same conditions as in EXAMPLE VII. The water coverage was approximately 6500 and the product was a bright attractive pigment.

EXAMPLE XIV

A test was carried out using cupro nickel 90/10 under the same conditions as in the preceding Example. The water coverage was approximately 6000 and the product was a bright attractive pigment.

EXAMPLE XV

A test was carried out using atomized cupro nickel 80/20 under the same conditions as in the preceding Example. The water coverge was approximately 6000 and the product was a bright attractive pigment.

EXAMPLE XVI

A test was carried out using atomized cupro nickel 70/30 under the same conditions as in the preceding Example. The water coverage was approximately 6000 and the product was a bright attractive pigment.

EXAMPLE XVII

A test was carried out using brass 70/30 under the same conditions as in the preceding Example. The water coverage was approximately 6000 and the product was a bright attractive pigment.

EXAMPLE XVIII

A test using ferro-chrome powder was carried out under the same conditions as in the preceding Example except that milling time was four hours and that the metal to lubricant ratio was 14.5:1. The water coverage was approximately 6000 and the product was a bright attractive pigment.

Example IV reveals that in using conditions appropriate to tube ball mills, virtually no flaking (only grinding) occurs.

Examples V, VI and VII compared to Example IV demonstrate the superiority of a lower ratio of balls to metal, in particular 37:1 is superior to 40:1.

Example VII as contrasted to Examples V and VI clearly demonstrates the superiority of a lower weight ratio of mineral spirits to metal. In particular 0.6:1 is superior to 2.3:1. The superiority of the conditions according to the present invention is shown by an increased yield of minus 325 mesh product per unit milling time as well as increased water coverage.

Further, a comparison of Example VIII with Example IX, and of Example X with Example XI will show that the use of additional baffles improves the quality of the pigment as shown by the water coverge values.

The surface of the metal flake obtained from each example was evaluated to estimate the comparative flaking efficiency. The method of evaluation used is described in the Edwards et al reference book mentioned, the relevant pages of which are hereby incorporated by reference.

The examples show that the viscosity of the batch comprising the spherical grinding media, inert liquid, metal and lubricant is considerably higher than that required for tube milling. Hence, the batch composition and temperature diverge markedly from those of the prior art.

The increase in viscosity reduces the mobility of the spherical grinding media within the batch, and after a short period the whole batch tends to acquire a speed that is close to that of the rotating arms, thus considerably reducing the flaking efficiency of the apparatus. This difficulty is overcome by the provision of the baffles through the use of the attachment described above or other similar device known in the art.

The use of this equipment for the production of flaked metal powders is not limited by the scope of the examples. Other configurations and variations within the scope of the invention will be apparent to those skilled in the art.

I claim:

1. A method of making flaked metal powders wherein a heterogeneous liquid system comprising a inert liquid and a lubricant and including a finely divided metal, is subjected to attrition in an enclosure in which there are a plurality of attritive elements, an agitator being moved through the elements to displace those in its path, wherein the ratio of attritive elements to finely divided metal is between 37 to 1 and 10 to 1 by weight.

2. A method as defined in claim 1 wherein the ratio of inert liquid to finely divided metal is between 0.5 to 1 and 1 to 4 by weight and the ratio of finely divided metal to lubricant is between 30 to 1 and 1 to 1 by weight.

3. A method as defined in claim 1 in which the attritive elements have a diameter within the range of 1/32 inch to 1 inch (0.8 mm and 25.4 mm).

4. A method as defined in claim 1, in which the temperature is maintained within the range from 60° F to 150° F (15.6° C to 65.6° C) and the time is in the range of 1 to 16 hours.

5. A method as defined in claim 1 in which the time is approximately 4 hours.

6. A method as defined in claim 1 wherein the attritive elements and the liquid system are subjected to an additional agitating effect in a relative direction counter to that in which the agitator moves.

7. A method as defined in claim 6 wherein the additional agitating effect is produced by means projecting into the enclosure in intercepting relationship to the mass of attritive elements.

8. A method as defined in claim 7 wherein said means include rods projecting into the enclosure from the top thereof and disposed adjacent the sides of the enclosure.

9. A method as defined in claim 7 wherein said means include at least one baffle projecting into the enclosure from a vertical wall thereof.

10. A method as defined in claim 9 wherein said at least one baffle is substantially parallel to the vertical axis of the enclosure.

11. A method according to claim 1 including the step of forming the finely divided metal by passing metal through first grinding means prior to being loaded in said enclosure.

12. A method according to claim 11, wherein said first grinding means is a continuous ball mill system and said metal is passed through said mill together with the liquid components of said liquid system.

13. A method according to claim 12, wherein flaked metal powder is delivered from said ball mill to said enclosure which grinds the flaked metal powder to a smaller flaked size.

14. A method as defined in claim 1, in which said finely divided metal comprises a malleable and ductile metal or alloy.

15. A method as defined in claim 1, in which said finely divided metal is selected from the group consisting of aluminum, copper, zinc, stainless steel, carbonyl nickel, cupro nickel, brass, and ferro-chrome.

16. A method as defined in claim 15 in which the attritive elements have a diameter of about ⅛ inch (3.175 mm).

17. Apparatus for making flaked metal particles from a charge of finely divided metal, said apparatus including an enclosure containing a mass of attritive elements and an agitator consisting of a vertical shaft and a plurality of transverse vertically spaced agitator elements mounted thereon, said agitator adapted to move through the mass of attritive elements and to displace those in its path about a vertical axis to agitate the mass, and a plurality of rods downwardly extending into the enclosure perpendicular to the agitator elements to project into the mass of attritive elements, at least some of said rods disposed adjacent the sides of said enclosure to deflect the mass towards the axis of the enclosure, thereby creating a vortex and a movement within the mass, said movement being parallel to said vertical axis.

18. Apparatus according to claim 17 and further including a first grinding means adapted to grind metal to a finely divided form prior to the loading of said metal in the enclosure.

19. Apparatus according to claim 17 and further including second grinding means adapted to grind flake metal powder delivered from said enclosure to a smaller flake size.

* * * * *